United States Patent
Arata et al.

(10) Patent No.: US 11,840,123 B2
(45) Date of Patent: Dec. 12, 2023

(54) VEHICULAR SEAT

(71) Applicant: TACHI-S CO., LTD., Akishima (JP)

(72) Inventors: Kazuyoshi Arata, Akishima (JP); Takao Tsutsui, Akishima (JP)

(73) Assignee: TACHI-S CO., LTD., Tokyo (JP)

(*) Notice: Subject to any disclaimer, the term of this patent is extended or adjusted under 35 U.S.C. 154(b) by 329 days.

(21) Appl. No.: 17/127,926

(22) Filed: Dec. 18, 2020

(65) Prior Publication Data

US 2021/0221194 A1 Jul. 22, 2021

Related U.S. Application Data

(62) Division of application No. 16/283,783, filed on Feb. 24, 2019, now Pat. No. 11,458,800.

(30) Foreign Application Priority Data

Mar. 20, 2018 (JP) ................... 2018-052114

(51) Int. Cl.
  *B60H 1/00* (2006.01)
  *B60N 2/56* (2006.01)

(52) U.S. Cl.
  CPC ....... *B60H 1/00285* (2013.01); *B60N 2/5621* (2013.01)

(58) Field of Classification Search
  CPC .............. B60H 1/00285; B60N 2/5621; B60N 2/5635; B60N 2/5657; B60N 2/5642
  USPC ....................................................... 454/120
  See application file for complete search history.

(56) References Cited

U.S. PATENT DOCUMENTS

| | | | |
|---|---|---|---|
| 4,997,230 A | 3/1991 | Spitalnick | |
| 7,901,002 B2 | 3/2011 | Mashimo | |
| 8,827,372 B2 * | 9/2014 | Yoon ................... | B60N 2/5628 297/180.13 |
| 10,272,806 B2 * | 4/2019 | Bauer .................. | B60N 2/5657 |
| 10,814,752 B2 | 10/2020 | Arata et al. | |

(Continued)

FOREIGN PATENT DOCUMENTS

| | | |
|---|---|---|
| CN | 201296194 Y | 8/2009 |
| CN | 101811459 A | 8/2010 |

(Continued)

OTHER PUBLICATIONS

Office Action dated Jan. 19, 2021, in U.S. Appl. No. 16/283,783.

(Continued)

*Primary Examiner* — Allen R. B. Schult
(74) *Attorney, Agent, or Firm* — Potomac Law Group, PLLC

(57) ABSTRACT

There is provided a vehicular seat capable of using an air supply fan having a relatively small capacity so that a thickness of the air supply fan does not become one of factors in determining a thickness of a seat in realizing the reduction of the thickness of the seat. A vehicular seat includes: an air supply fan; an air supply chamber which forms a passage for air supplied from the air supply fan; and a urethane pad which sandwiches the air supply chamber and has a plurality of portions in each of which a hole through which air supplied from the air supply chamber passes is formed. The air supply chamber is formed so as to cover in a planar surface shape a region of the urethane pad including the plurality of portions in each of which the hole is formed.

2 Claims, 8 Drawing Sheets

(56) References Cited

U.S. PATENT DOCUMENTS

2002/0096915 A1   7/2002   Haupt et al.
2003/0102699 A1   6/2003   Aoki et al.
2010/0327636 A1   12/2010  Stoll et al.

FOREIGN PATENT DOCUMENTS

JP    2003-165325 A    6/2003
JP    2012-105816 A    6/2012

OTHER PUBLICATIONS

Office Action dated May 25, 2021, in Chinese Patent Application No. 201910148926.8.
Office Action dated Jun. 22, 2021, in U.S. Appl. No. 16/283,783.
Office Action dated Nov. 19, 2021, in U.S. Appl. No. 16/283,783.

* cited by examiner

VEHICULAR SEAT

BACKGROUND OF THE INVENTION

The present invention relates to a seat for a vehicle.

With respect to a vehicular seat, there has been known a vehicular seat having a function of adjusting a temperature of a seating surface where the vehicular seat includes an air supply fan, and air supplied from the air supply fan is blown off from a surface of a seat cushion or a surface of a seat back through a duct formed in the inside of a pad thus adjusting the temperature of the seating surface.

With respect to the seat back having such a configuration, for example, JP-A-2012-105816 discloses a foaming mold for a seat pad incorporating a duct therein. Such a foaming mold is formed of a pair of split molds, an air distribution duct having an air inlet port and an air blow off port is set in a duct passage. After injecting a foaming material and closing the split molds, the duct is embedded in the foaming material, and the seat pad is molded by foaming. A hemispherical protruding portion is formed on a portion of a mold surface of one of these split molds corresponding to the air inlet port or the air blow off port. When both split molds are closed, the protruding portion enters the inside of the air inlet port or the inside of the air blow off port of the duct set in the foaming mold, and closes the air inlet port or the air blow off port. Accordingly, in forming the seat pad by integral foaming molding by embedding the air distribution duct which has the air inlet port and the air blow off port in the duct passage, it is possible to prevent the foaming material from intruding into the duct from the air inlet port or the air blow off port.

On the other hand, JP-A-2003-165325 discloses a structure where air is supplied from an air discharge fan to a cushion member through a mounting bracket.

SUMMARY OF INVENTION

As one of needs which a vehicular seat is required to satisfy, it is necessary to increase a space in a vehicle as much as possible by decreasing a thickness of the seat. In reducing of the thickness of the seat, an air supply fan mounted on a seat back side for air-conditioning a seat back becomes one of factors in determining the thickness of the seat.

As described in JP-A-2012-105816, air supplied from the air supply fan for air conditioning mounted on the seat back side passes through a duct disposed in the inside of the seat back, and is blown off from a surface of the seat back through air blow off holes formed in the seat pad.

In such a configuration, narrow elongated pipe passages are formed in the duct for blowing off air from respective portions of the seat back. To blow off a sufficient amount of air from the air blow off holes formed in the seat pad also in the vicinity of distal end portions of such narrow elongated pipe passages, it is necessary to maintain a capacity of the air supply fan to some extent.

In the case where such an air supply fan having a large capacity is used, as described in JP-A-2003-165325, it is necessary to adopt the configuration where air is supplied from the air discharge fan to through holes formed in the cushion member through the mounting bracket. With such a configuration, a size (thickness) of the air supply fan becomes one of factors in determining the thickness of the seat for reducing the thickness of the seat.

The present invention has been made to overcome the abovementioned drawbacks of the related art, and it is an object of the present invention to provide a vehicular seat capable of using an air supply fan having a relatively small capacity so that a thickness of the air supply fan does not become one of factors in determining a thickness of a seat in realizing the reduction of the thickness of the seat.

To overcome the abovementioned drawbacks, according to an aspect of the present invention, there is provided a vehicular seat which includes: an air supply fan; an air supply chamber which forms a passage for air supplied from the air supply fan; and a urethane pad which sandwiches the air supply chamber and has a plurality of portions in each of which a hole through which air supplied from the air supply chamber passes is formed, wherein the air supply chamber is formed so as to cover in a planar surface shape a region including the plurality of portions of the urethane pad in each of which the hole is formed.

To overcome the abovementioned drawbacks, according to another aspect of the present invention, there is provided a vehicular seat which includes: an air supply fan; an air supply chamber which forms a passage for air supplied from the air supply fan; and a urethane pad which sandwiches the air supply chamber and has a plurality of portions in each of which a hole through which air supplied from the air supply chamber passes is formed, wherein the air supply chamber includes an upper surface side chamber (upper wall) and a lower surface side chamber (lower wall) disposed in an oppositely facing manner with the upper surface side chamber, a plurality of protruding members are formed on either one of the upper surface side chamber or the lower surface side chamber, and a distance between oppositely facing surfaces of the upper surface side chamber and the lower surface side chamber is maintained by the plurality of protruding members.

According to the present invention, the structure is adopted where air resistance of the passage for supplying air formed in the seat for blowing off air supplied from the air supply fan from a surface of the seat can be made as small as possible. Accordingly, it is possible to adopt a small-sized air supply fan which has a small capacity and a small thickness compared to the prior art and hence, a thickness of the seat can be reduced.

DESCRIPTION OF PREFERRED EMBODIMENTS

The present invention is characterized in that a passage for supplying air (corresponding to the duct in the prior art) formed in a seat for blowing off air supplied from an air supply fan from a surface of the seat adopts the structure which can reduce air resistance as small as possible. With such a structure, it is possible to reduce a capacity of the air supply fan compared to the prior art and hence, it is possible to adopt a small-sized air supply fan having a small thickness compared to the prior art. Accordingly, it is possible to decrease a thickness of the seat.

Hereinafter, embodiments of the present invention are described with reference to drawings. The present invention is not limited to the embodiments described hereinafter, and various modifications are also conceivable. The embodiments described hereinafter are descried in detail for facilitating understanding of the present invention, and the present invention is not always limited to the configuration including all of the constitutional elements described in the embodiments. Further, a part of the configuration of one embodiment may be replaced with the configuration of another embodiment, and the configuration of another embodiment may be also added to the configuration of one embodiment. Further, with respect to a part of the configuration of each embodiment, other configuration may be added to the part, the part of the configuration may be deleted, or the part may be replaced with other configuration.

First Embodiment

Figure 1:
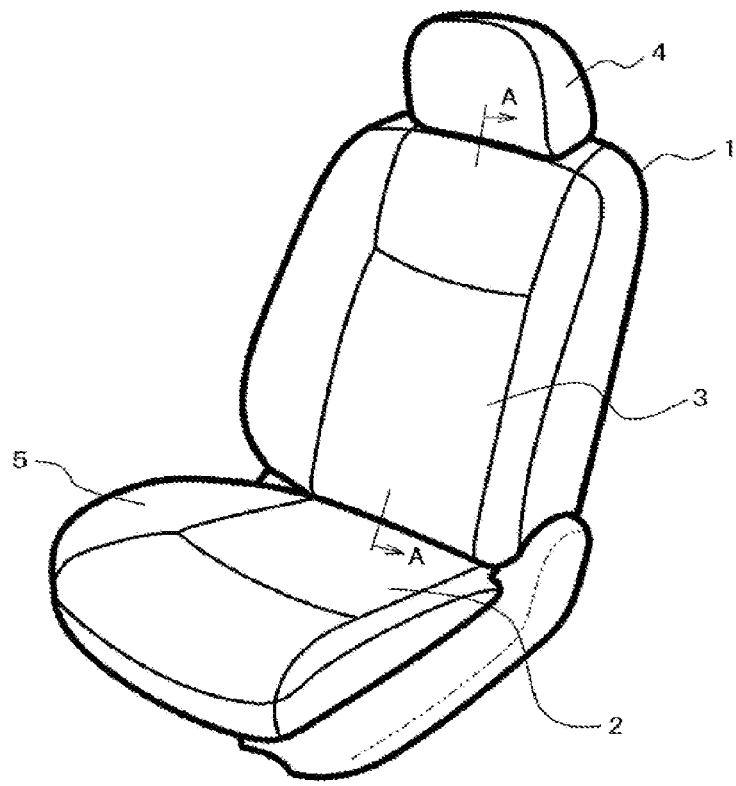
FIG. 1 is a perspective view of a vehicular seat showing an external appearance of the vehicular seat according to the present invention.

FIG. 1 shows an external appearance of a vehicular seat 1 according to the present invention. The vehicular seat 1 according to the present invention includes: a seat cushion 2 on which an occupant is seated; a seat back 3 against which the occupant seated on the seat cushion 2 leans his back; and a headrest 4 which supports a head portion of the occupant; and side supports 5 which are formed on both sides of the seat cushion 2.

Figure 2:
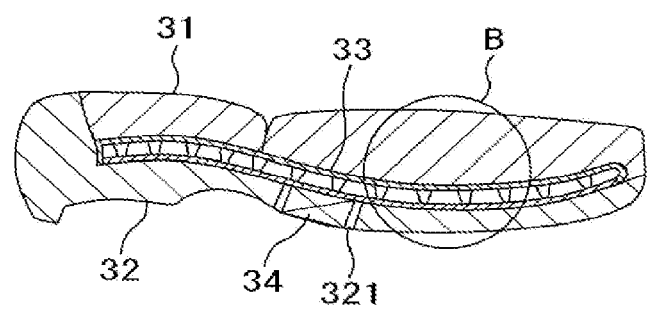
FIG. 2 is a cross-sectional view of a seat back of the vehicular seat according to a first embodiment of the present invention as viewed in a direction indicated by an arrow A-A in FIG. 1.

FIG. 2 is a cross-sectional view of the seat back 3 as viewed in a direction indicated by an arrow A-A in FIG. 1. In the cross-sectional structure of the seat back, FIG. 2 shows a portion of a urethane pad which forms the seat back according to this embodiment, and other configurations are omitted or are described in a simplified manner.

In the configuration shown in FIG. 2, symbol 31 indicates an upper surface side urethane pad of the seat back 3 with which the back of the occupant is brought into contact, symbol 32 indicates a lower surface side urethane pad. An air supply chamber 33 is sandwiched between the upper surface side urethane pad 31 and the lower surface side urethane pad 32. A hole-shaped window portion 321 is formed in the lower surface side urethane pad 32, and the air supply fan 34 is communicated with the air supply chamber 33 at the window portion 321.

Figure 3:
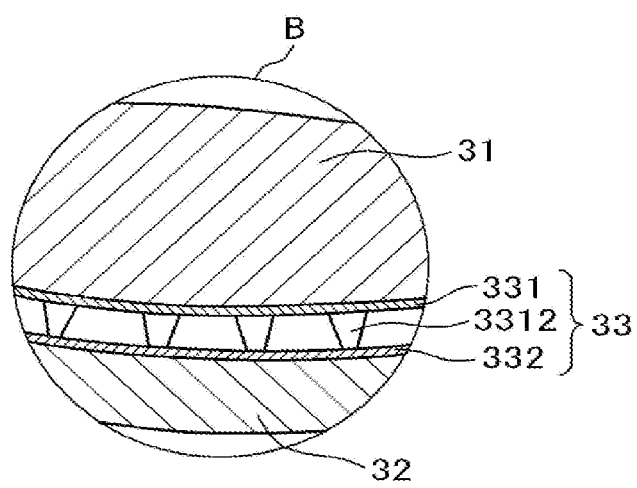
FIG. 3 is an enlarged cross-sectional view of a portion of the seat back of the vehicular seat according to the first embodiment of the present invention surrounded by a circle B in FIG. 2.

FIG. 3 shows a configuration of a portion of the vehicular seat 1 surrounded by a circle B in FIG. 2 in detail. The air supply chamber 33 sandwiched between the upper surface side urethane pad 31 and the lower surface side urethane pad 32 is formed by an upper surface side chamber 331 and a lower surface side chamber 332. A fixed distance is maintained between the upper surface side chamber 331 and the lower surface side chamber 332 by bosses 3312 formed on the upper surface side chamber 331.

Figure 4:
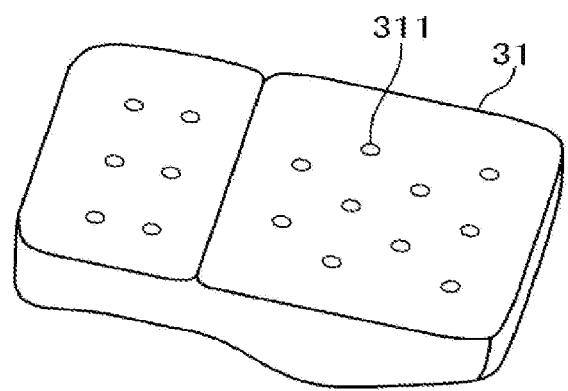
FIG. 4 is a perspective view of an upper surface side urethane pad of the seat back of the vehicular seat according to the first embodiment of the present invention.

FIG. 4 is a perspective view of the upper surface side urethane pad 31. A large number of through holes 311 are formed in the upper surface side urethane pad 31. The through holes 311 are holes for blowing off air supplied from the air supply fan 34 to a back side of an occupant seated on the seat.

Figure 5:
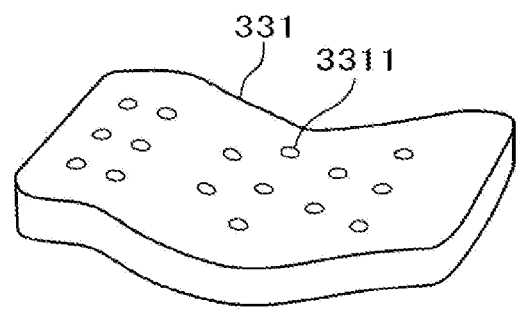
FIG. 5 is a perspective view of an upper surface side chamber of an air supply chamber of the seat back of the vehicular seat according to the first embodiment of the present invention.

FIG. 5 is a perspective view of the upper surface side chamber 331. The upper surface side chamber 331 has a shape which allows the upper surface side chamber 331 to cover all through holes 311 formed in the upper surface side urethane pad 31. The air supply holes 3311 are formed in the upper surface side chamber 331 at positions corresponding to all through holes 311 formed on an upper surface side urethane pad 31 side. That is, the upper surface side chamber 331 is not formed in a shape described in JP-A-2012-105816 where the upper surface side chamber 331 has a plurality of air supply passages branched, but is formed in a wide planar surface shape which allows the upper surface side chamber 331 to cover a whole region of an upper surface side urethane pad 31 where the through holes 311 are formed.

The upper surface side chamber 331 has a curved shape which conforms to a shape of a back of an occupant when the seated occupant leans his back against the seat back 3. On a back surface side of the upper surface side chamber 331 shown in FIG. 5, the bosses 3312 shown in FIG. 3 are formed at plural portions.

The bosses 3312 may be formed on a lower surface side chamber 332. Alternatively, the bosses 3312 may be formed on an upper surface side chamber 331 and the lower surface side chamber 332. It is not always necessary that the bosses 3312 have the same shape in cross section. For example, the boss 3312 may have a large cross-sectional area at portions where a relatively large force is applied to the seat back 3. With such a configuration, even when a relatively large force is applied to such portions, a distance between the upper surface side chamber 331 and the lower surface side chamber 332 can be maintained. Further, the boss 3312 may have a small cross-sectional area at portions where only a relatively small force is applied so as to reduce a resistance against air flowing through the chamber 33.

A surface of the upper surface side urethane pad 31 which is brought into contact with an upper surface of the upper surface side chamber 331 is formed substantially in the same curved surface as the upper surface of the upper surface side chamber 331.

Figure 6:
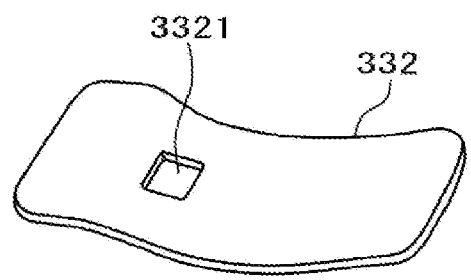
FIG. 6 is a perspective view of a lower surface side chamber of the air supply chamber of the seat back of the vehicular seat according to the first embodiment of the present invention.

FIG. 6 is a perspective view of the lower surface side chamber 332. The lower surface side chamber 332 has substantially the same shape as the upper surface side chamber 331, and a hole 3321 in which the air supply fan is mounted is formed in the lower surface side chamber 332.

Figure 7:
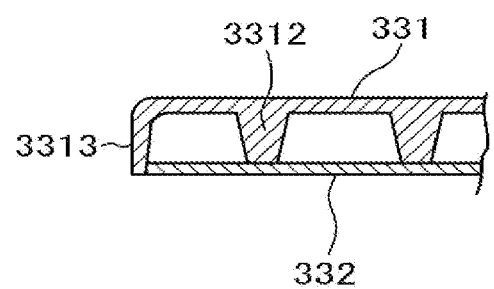
FIG. 7 is a cross-sectional view of the air supply chamber of the seat back of the vehicular seat according to the first embodiment of the present invention in the vicinity of an end portion of the air supply chamber.

The upper surface side chamber 331 and the lower surface side chamber 332 are resin-made parts and are formed by molding. FIG. 7 shows an end portion 3313 and an area in the vicinity of the end portion 3313 in a state where the upper surface side chamber 331 and the lower surface side chamber 332 are assembled to each other. The upper surface side chamber 331 is formed in a shape where an end portion 3313 of the upper surface side chamber 331 extends toward a lower surface side chamber 332 side and the lower surface side chamber 332 is fitted in the upper surface side chamber 331. In a state where the lower surface side chamber 332 is fitted in the upper surface side chamber 331, the plurality of bosses 3312 formed on the upper surface side chamber 331 are brought into contact with the lower surface side chamber 332.

An air supply portion defined between the upper surface side chamber 331 and the lower surface side chamber 332 is formed over the upper surface side chamber 331 which covers a plurality of regions of the upper surface side urethane pad 31 where the through holes 311 are formed in a planar surface shape and the lower surface side chamber 332 over the whole width direction. Accordingly, the air supply portion ensures a relatively large cross-sectional area. With such a configuration, compared to the configuration described in JP-A-2012-105816 or JP-A-2003-165325, air supply resistance can be made relatively small. With respect to the air supply portion defined between the upper surface side chamber 331 and the lower surface side chamber 332, a distance between the upper surface side chamber 331 and the lower surface side chamber 332 is maintained by the plurality of bosses 3312 formed on the upper surface side chamber 331. Accordingly, even in a state where a seated occupant leans his back against the seat back 3, there is no possibility that a space (air supply portion) defined between the upper surface side chamber 331 and the lower surface side chamber 332 collapses. As a result, air supply resistance can be made small compared to the case where a conventional air supply duct having a relatively small cross-sectional area is used and hence, a smaller-sized air supply fan can be adopted as the air supply fan 34 compared to the prior art.

In this manner, it is possible to adopt a relatively smaller-sized air supply fan compared to the prior art as the air supply fan 34 and hence, the air supply fan 34 can be mounted on the lower surface side chamber 332 directly or by way of a mounting member without using a mounting bracket described in JP-A-2003-165325.

Figure 8:
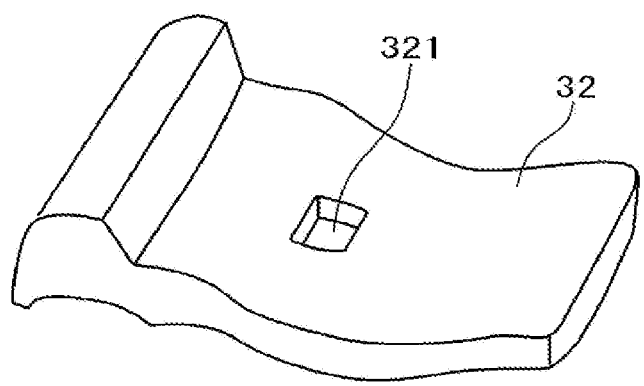
FIG. 8 is a perspective view of a lower surface side urethane pad of the seat back of the vehicular seat according to the first embodiment of the present invention.

FIG. 8 is a perspective view of the lower surface side urethane pad 32. An upper surface of the lower surface side urethane pad 32 is formed in a shape substantially equal to a shape of the lower surface of the lower surface side chamber 332 with which the lower surface side urethane pad 32 is brought into contact. Further, the window portion 321 is formed in the lower surface side urethane pad 32 so as to prevent the lower surface side urethane pad 32 from interfering with the air supply fan 34 mounted on the lower surface side chamber 332.

As described above, the air supply fan 34 can be directly mounted on the lower surface side chamber 332 in a state where the air supply fan 34 is disposed in the window portion 321 formed on the lower surface side urethane pad 32. Accordingly, as shown in FIG. 2 which is a cross-sectional view, the air supply fan 34 can be disposed in a state where the air supply fan 34 is embedded in the lower surface side urethane pad 32 and hence, a thickness of the seat back 3 can be decreased by at least an amount of a thickness of the lower surface side urethane pad 32.

Figure 9:
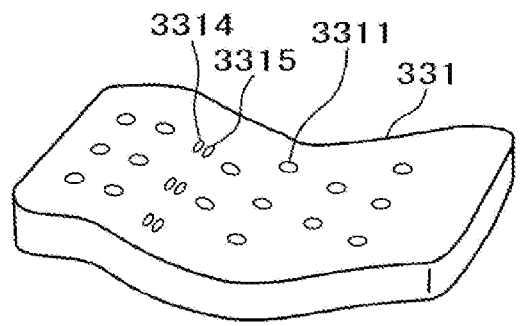
FIG. 9 is a perspective view of the upper surface side chamber showing a state where a pair of holes 3314, 3315 is formed at a plurality of portions of the upper surface side chamber of the air supply chamber of the seat back of the vehicular seat according to the first embodiment of the present invention.
Figure 10:
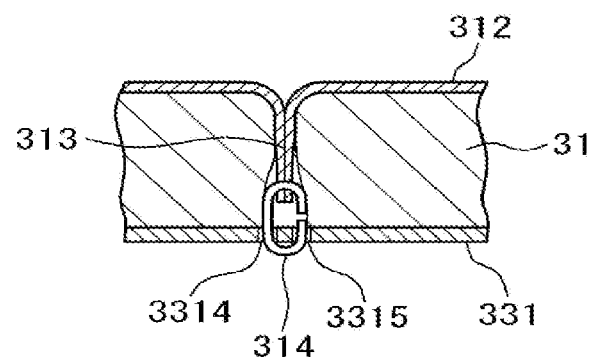
FIG. 10 is a partially cross-sectional view of the seat back of the vehicular seat according to the first embodiment of the present invention showing a state where a suspending member 314 for suspending a seamed portion 313 of a surface skin member 312 which covers a surface of the upper surface side urethane pad 31 is mounted on a portion between the pair of holes 3314, 3315 formed in the upper surface side chamber of the air supply chamber.

In the abovementioned configuration, a pair of holes 3314, 3315 may be formed in the upper surface side chamber 331 at plural positions as shown in FIG. 9, and suspending members 314 each suspending a seamed portion 313 of a surface skin member 312 which covers a surface of the upper surface side urethane pad 31 may be mounted as shown in FIG. 10. With such a configuration, it is possible to eliminate wires for mounting the suspending members 314 which are embedded in the upper surface side urethane pad 31 conventionally.

According to this embodiment, air supply resistance is decreased by increasing the cross-sectional area of the air supply passage formed in the urethane pad which forms the seat back and hence, it is possible to adopt the relatively smaller-sized air supply fan compared to the prior art so that a thickness of the seat back can be decreased.

Second Embodiment

A second embodiment of the present invention is described with reference to FIGS. 11A, 11B, and FIG. 12.

Figure 11A:
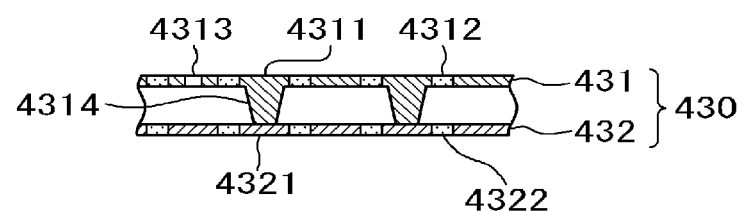
FIGS. 11A and 11B are cross-sectional views of an air supply chamber of a seat back of a vehicular seat according to a second embodiment of the present invention.

In this embodiment, an upper surface side chamber 431 and a lower surface side chamber 432 shown in FIG. 11A are used in place of the upper surface side chamber 331 and the lower surface side chamber 332 which are formed by molding a resin material described in the first embodiment.

In this embodiment, the upper surface side chamber 431 is divided into: a region consisting of regions where the air supply holes 3311 described in the first embodiment are formed and regions where the bosses 3312 described in the first embodiment are formed; and a region where neither the air supply holes 3311 nor the bosses 3312 are formed. Out of these regions, the regions where the air supply holes 4313 are formed and the regions where bosses 4314 are formed are respectively formed using a resin member 4311 which is formed by molding a resin substantially in the same manner as the first embodiment. On the other hand, the region where neither the air supply holes 3311 nor the bosses 3312 are formed is formed using a flexible member 4312 such as an elastomer, and is connected with the members formed by molding the resin.

The lower surface side chamber 432 is formed such that regions of the lower surface side chamber 432 which oppositely face resin members 4311 of the upper surface side chamber 431 are formed of resin members 4321, and a region of the lower surface side chamber 432 which oppositely faces a region of the upper surface side chamber 431 formed of a flexible member 4312 such as an elastomer is formed of a flexible member 4322 such as an elastomer.

With such a configuration, a chamber 430 having a cross-sectional structure shown in FIG. 11A is formed. In the chamber 430, unlike the chamber 33 described in the first embodiment, the upper surface side chamber 431 and the lower surface side chamber 432 are formed into a flat planar shape.

Figure 12:
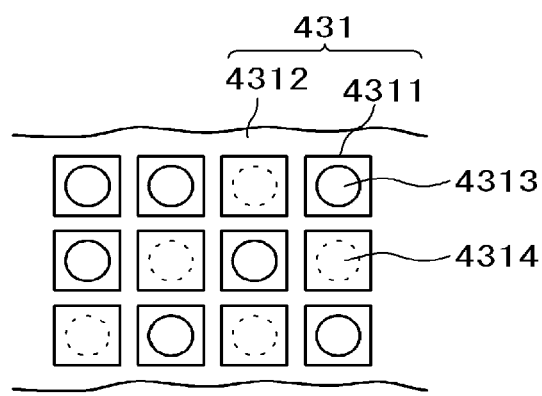
FIG. 12 is a plan view of the air supply chamber of the seat back of the vehicular seat according to the second embodiment of the present invention.

FIG. 12 is a plan view showing a portion of the upper surface side chamber 431 in a state shown in FIG. 11A. The upper surface side chamber 431 has the structure where the resin members 4311 which are formed by molding a resin and in each of which the air supply hole 4313 or the boss 4314 is formed are connected to each other by the flexible member 4312 such as an elastomer.

Figure 11B:
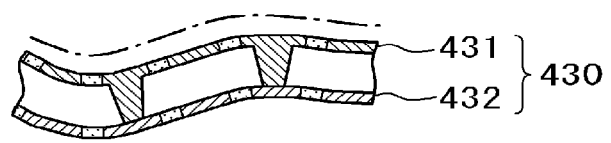

When an occupant leans his back against the seat back 3 using the chamber 430 having such a structure, as shown in FIG. 11B, the regions formed of the flexible member 4312 are deformed so that the chamber 430 is deformed in a shape which conforms to a back of an occupant.

According to this embodiment, even when an occupant leans his back against the seat back 3, the upper surface side chamber 431 and the lower surface side chamber 432 are deformed in a shape which conforms to a back of the occupant in a state where a distance between the upper surface side chamber 431 and the lower surface side chamber 432 corresponding to a height of the bosses 4314 is maintained. Accordingly, it is possible to prevent the occupant from having uncomfortable feeling, and it is also possible to adopt a relatively small-sized air supply fan compared to the prior art thus capable of reducing a thickness of the seat back.

Third Embodiment

In this embodiment, the description is made with respect to the case where, in place of the flexible member 4312 such as an elastomer described in the second embodiment, an upper surface side chamber and a lower surface chamber are formed using the same material for forming the resin member 4321 formed by molding a resin while reducing a thickness of portions of the upper surface side chamber and the lower surface side chamber for imparting flexibility to such portions.

Figure 13:
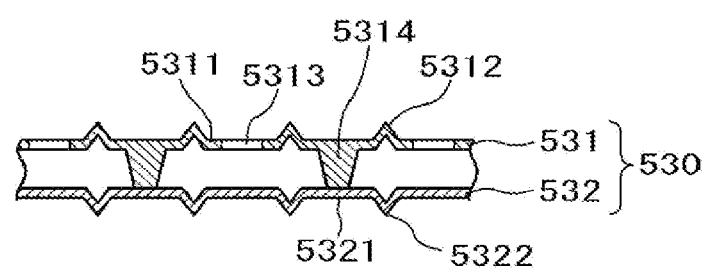
FIG. 13 is a cross-sectional view of an air supply chamber of a seat back of a vehicular seat according to a third embodiment of the present invention.
Figure 14:
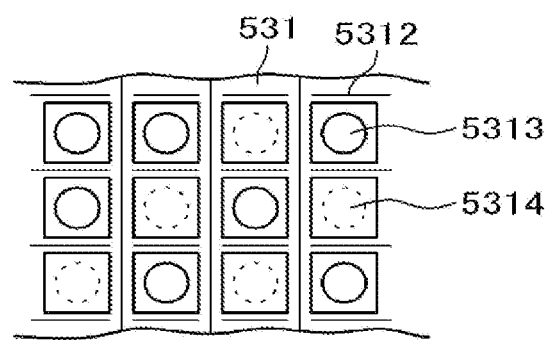
FIG. 14 is a plan view of the air supply chamber of the seat back of the vehicular seat according to the third embodiment of the present invention.

FIG. 13 is a cross-sectional view of an upper surface side chamber 531 and a lower surface side chamber 532 according to this embodiment, and FIG. 14 is a plan view of a portion of the upper surface side chamber 531. The upper surface side chamber 531 according to this embodiment is formed of a resin member 5311 formed by molding a resin, and the portion 5312 having a small thickness are formed at portions other than portions where air supply holes 5313 or bosses 5314 are formed. Also in the lower surface side chamber 532, portions 5322 having a small thickness are formed at positions of a resin member 5321 formed by molding a resin which oppositely face the portions 5312 having small thickness of the upper surface side chamber 531.

When an occupant leans his back against the seat back 3 using the chamber 530 having such a structure, the chamber 530 is deformed into a shape which conforms to the back of the occupant due to the deformation of the regions where the small-thickness portions 5312, 5322 are formed.

According to this embodiment, even when an occupant leans his back on the seat back 3, the upper surface side chamber 531 and the lower surface side chamber 532 are deformed into a shape which conforms to the back of the occupant in a state where a distance between the upper surface side chamber 531 and the lower surface side chamber 532 corresponding to a height of the bosses 5314 is maintained. Accordingly, it is possible to prevent the occupant from having uncomfortable feeling, it is also possible to adopt a relatively small-sized air supply fan compared to the prior art thus reducing a thickness of the seat back.

In the abovementioned first to third embodiments, the description has been made with respect to the case where the present invention is applied to the seat back 3. However, the present invention is also applicable to the seat cushion 2.

Although the inventions made by inventors of the present invention have been described specifically with reference to the embodiments heretofore, it is needless to say that the present invention is not limited to the abovementioned embodiments, and various modifications are conceivable without departing from the gist of the present invention. For example, the abovementioned embodiments are described in detail for facilitating understanding of the present invention, the present invention is not always limited to the configurations which include all of the constitutional elements described in the embodiments. Further, with respect to a part of the configuration of each embodiment, other configuration may be added to the part, the part of the configuration may be deleted, or the part may be replaced with other configuration.

What is claimed is:

1. A vehicular seat comprising:
an air supply fan;
an air supply chamber which forms a passage for air supplied from the air supply fan; and
a urethane pad which sandwiches the air supply chamber and has a plurality of portions in each of which a hole through which air supplied from the air supply chamber passes is formed,
wherein the air supply chamber includes an upper wall and a lower wall disposed in an oppositely facing manner with the upper wall, a plurality of protruding members are formed on either one of the upper wall or the lower wall, and a distance between oppositely facing surfaces of the upper wall and the lower wall is maintained by the plurality of protruding members,
wherein a portion of the upper wall or the lower wall where the plurality of protruding members are formed is made of resin, and
wherein the plurality of the portions of the upper wall or the lower wall where the protruding members are formed, and portions around holes formed in the upper wall which are formed at positions overlapping with the holes formed in the urethane pad are respectively made of resin, and the plurality of portions made of resin are connected to each other by a flexible member.

2. A vehicular seat comprising:
an air supply fan;
an air supply chamber which forms a passage for air supplied from the air supply fan; and
a urethane pad which sandwiches the air supply chamber and has a plurality of portions in each of which a hole through which air supplied from the air supply chamber passes is formed,
wherein the air supply chamber includes an upper wall and a lower wall disposed in an oppositely facing manner with the upper wall, a plurality of protruding members are formed on either one of the upper wall or the lower wall, and a distance between oppositely facing surfaces of the upper wall and the lower wall is maintained by the plurality of protruding members,
wherein the upper wall and the lower wall are made of resin, and a thickness of the resin between the plurality of portions of the upper wall or the lower wall where the protruding members are formed and portions around holes formed in the upper wall which are formed at positions overlapping with the holes formed in the urethane pad is set smaller than a thickness of the resin of the plurality of portions where the protruding members are formed and the resin of the portions around the holes formed in the upper wall.

* * * * *